United States Patent
Ganu

(10) Patent No.: US 12,135,285 B2
(45) Date of Patent: Nov. 5, 2024

(54) METHODS AND SYSTEMS FOR OPTIMAL CAPTURE OF A MULTI-CHANNEL IMAGE FROM AN LSPR SPECTROMETER

(71) Applicant: Nicoya Lifesciences Inc., Kitchener (CA)

(72) Inventor: Sanat Ganu, Pune (IN)

(73) Assignee: Nicoya Lifesciences Inc., Kitchener (CA)

( * ) Notice: Subject to any disclaimer, the term of this patent is extended or adjusted under 35 U.S.C. 154(b) by 0 days.

(21) Appl. No.: 18/556,324

(22) PCT Filed: Apr. 20, 2022

(86) PCT No.: PCT/CA2022/050603
§ 371 (c)(1),
(2) Date: Oct. 19, 2023

(87) PCT Pub. No.: WO2022/221947
PCT Pub. Date: Oct. 27, 2022

(65) Prior Publication Data
US 2024/0192135 A1    Jun. 13, 2024

Related U.S. Application Data

(60) Provisional application No. 63/177,486, filed on Apr. 21, 2021.

(51) Int. Cl.
*G01N 21/552* (2014.01)
(52) U.S. Cl.
CPC .................. *G01N 21/554* (2013.01)
(58) Field of Classification Search
CPC .................. G01N 21/554; G01N 2201/122

USPC .................................. 356/301, 300
See application file for complete search history.

(56) References Cited

U.S. PATENT DOCUMENTS

| | | | |
|---|---|---|---|
| 8,693,003 B2 | 4/2014 | Nieva et al. | |
| 9,322,823 B2 | 4/2016 | Denomme et al. | |
| 10,794,904 B2 | 10/2020 | Denomme et al. | |
| 11,252,337 B1 * | 2/2022 | Yang | H04N 23/65 |
| 11,278,890 B2 | 3/2022 | Denomme et al. | |
| 11,598,771 B2 | 3/2023 | Denomme et al. | |

(Continued)

FOREIGN PATENT DOCUMENTS

| | | |
|---|---|---|
| CA | 2846909 A1 | 9/2014 |
| CA | 3061157 A1 | 3/2020 |

(Continued)

OTHER PUBLICATIONS

PCT/CA2022/050603 International Search Report and Written Opinion dated Jun. 30, 2022.

*Primary Examiner* — Sunghee Y Gray

(57) ABSTRACT

Methods and systems for optimal capture of a multi-channel image in a LSPR spectrometry is described herein. The method comprises 1) finding a plurality of valid groupings of channels, 2) determining total capture times for each valid grouping of channels, 3) determining a measure of exposure sub-optimality, 4) estimating the expected error in peak wavelength for each valid grouping, 5) finding an optimal grouping of channels by identifying the grouping with the lowest estimate of expected error in peak wavelength and 6) capturing a subsequent multi-channel image using the optimal grouping.

10 Claims, 5 Drawing Sheets

(56) References Cited

U.S. PATENT DOCUMENTS

| | | | |
|---|---|---|---|
| D983,682 S | 4/2023 | Lubjenka et al. | |
| 2009/0091645 A1* | 4/2009 | Trimeche | H04N 25/134 348/218.1 |
| 2009/0231578 A1* | 9/2009 | Ling | A61B 5/02007 356/301 |
| 2012/0101007 A1* | 4/2012 | Ahern | C30B 29/02 506/13 |
| 2017/0370836 A1* | 12/2017 | Gerion | G01N 21/82 |

FOREIGN PATENT DOCUMENTS

| | | |
|---|---|---|
| EM | 0080464110001 | 10/2020 |
| WO | WO-2011130844 A1 | 10/2011 |
| WO | WO-2020005768 A1 * | 1/2020 |
| WO | WO-2020031089 A1 | 2/2020 |
| WO | WO-2020049524 A1 | 3/2020 |
| WO | WO-2020061715 A1 | 4/2020 |
| WO | WO-2020065537 A1 | 4/2020 |
| WO | WO-2020186360 A1 | 9/2020 |
| WO | WO-2021097582 A1 | 5/2021 |
| WO | WO-2021146804 A1 | 7/2021 |
| WO | WO-2021146809 A1 | 7/2021 |
| WO | WO-2021168578 A1 | 9/2021 |
| WO | WO-2021212235 A1 | 10/2021 |
| WO | WO-2022051840 A1 | 3/2022 |
| WO | WO-2022082316 A1 | 4/2022 |
| WO | WO-2022164756 A2 | 8/2022 |
| WO | WO-2022165589 A1 | 8/2022 |
| WO | WO-2022187931 A1 | 9/2022 |
| WO | WO-2022187954 A1 | 9/2022 |
| WO | WO-2022221946 A1 | 10/2022 |
| WO | WO-2022221947 A1 | 10/2022 |
| WO | WO-2022246569 A1 | 12/2022 |
| WO | WO-2023004516 A1 | 2/2023 |
| WO | WO-2023039678 A1 | 3/2023 |
| WO | WO-2023147672 A1 | 8/2023 |
| WO | WO-2023147674 A1 | 8/2023 |
| WO | WO-2023168521 A1 | 9/2023 |
| WO | WO-2023178432 A1 | 9/2023 |

* cited by examiner

METHODS AND SYSTEMS FOR OPTIMAL CAPTURE OF A MULTI-CHANNEL IMAGE FROM AN LSPR SPECTROMETER

CROSS-REFERENCE TO RELATED APPLICATIONS

This application is a 371 application of International Application No. PCT/CA2022/050603, filed on Apr. 20, 2022, which claims priority to U.S. Patent App. No. 63/177,486, entitled "Method for Optimally Capturing a Multi-Channel Image from an LSPR Spectrometer," filed on Apr. 21, 2021, each of which is incorporated herein by reference in its entirety.

TECHNICAL FIELD

The present invention is in the field of localized surface plasmon resonance (LSPR) spectrometry. More specifically, the invention relates to methods and systems for optimal capture of a multi-channel image from an LSPR spectrometer.

BACKGROUND

A localized surface plasmon resonance (LSPR) spectrometer is a chemical analysis spectrometer in which ligand protein molecules are immobilized onto nanoparticles such as gold nanoparticles. The molecule to be analyzed, known as the analyte, binds to the ligand, causing a shift in LSPR resonant frequency of the nanoparticle-ligand complex. This resonant frequency is probed using absorbance/reflectance spectrometry, and is seen as a peak in the frequency/wavelength of the absorbance/reflectance. An LSPR spectrometer system captures a 2D image corresponding to the light reflected/absorbed from the binding site. The 2D image is composed of a horizontal array of spectral information, where the spread is due to optical diffraction, and vertical columns are the angle of incident light. The spectral information is along the horizontal direction. The end result is to analyze each 2D image to estimate the peak wavelength of the reflectance/absorbance spectrum.

An LSPR spectrometer system usually comprises multiple reaction kinetics channels. A separate analyte-ligand binding experiment can be carried out in each of the channels such that the reflected/absorbed light from the binding site falls on different regions of the imaging sensor of the LSPR spectrometer system. The imaging sensor allows 2D images corresponding to different channels to be captured all together or one after the other. It also allows 2D images of spatially contiguous channels to be grouped and captured together.

In a first scenario, if 2D images of all channels are captured together, the time required to capture 2D data of all channels is the least. In this scenario, the exposure time is constant across all channels; however, the level of exposure or the reflected/absorbed light intensity of each channel may not be the same. This causes optimal exposure of some channels and sub-optimal exposure of other channels.

In a second scenario, if 2D images of all channels are captured one channel at a time, one after the other, the time required to capture 2D data of all channels is the highest. Since each channel can be exposed to the optimal level, there is no sub-optimality in exposure. However, there is a higher cost in time required to capture the data.

Decreasing the capture times causes an increase in the suboptimality in exposure and this in turn causes an increase in the error in the estimated peak wavelength. Conversely, an increase in the time required to capture all channels causes a decrease in the suboptimality in exposure and this in turn causes a decrease in the error in the estimated peak wavelength. Thus, there is a trade-off between decreased capture times and decreased suboptimality. Accordingly, there is a need in the art for methods and systems that can be used for optimal grouping of channels to minimize error in the estimated peak wavelength while also minimizing capture times.

SUMMARY

The present invention is directed to methods and systems for optimal capture of a multi-channel image from localized surface plasmon resonance (LSPR) spectrometry. In one aspect, the present invention is directed to a method for optimal capture of a multi-channel image, the method comprising: 1) finding a plurality of valid groupings of reaction channels, 2) determining total capture times for each of valid grouping of channels, 3) determining a measure of exposure sub-optimality, 4) estimating the expected error in peak wavelength for each valid grouping, 5) finding an optimal grouping of channels by identifying the grouping with the lowest estimate of expected error in peak wavelength and 6) capturing a subsequent multi-channel image using the optimal grouping.

In one embodiment, the plurality of valid groupings of channels comprises 2 or more groupings of channels. In another embodiment, the plurality of valid groupings of channels comprises all possible valid groupings of channels.

In one embodiment, a valid grouping of channels comprises groupings wherein each group in the grouping only comprise contiguous channels. In another embodiment, the valid groupings are encoded using binary numbers.

In some embodiments, the error in peak wavelength for a grouping is estimated using interpolation of known peak wavelength errors at total frame capture times and exposure sub-optimalities close to those of the grouping. In other embodiments, the error in peak wavelength for a grouping is estimated using polynomial regression using pre-computed peak wavelength errors at predetermined total frame capture times and exposure sub-optimalities.

In some embodiments, the exposure sub-optimality for a group is equal to the lowest sub-optimality across all the channels in the grouping. In other embodiments, the exposure sub-optimality for a group is equal to the average sub-optimality over all the channels in the grouping. In still other embodiments, the exposure sub-optimality for a group is equal to the median sub-optimality across all the channels in the grouping.

In another embodiment, the present invention is directed to method for optimal capture of a multi-channel image in an LSPR spectrometer system, the method comprising: (a) providing an LSPR spectrometer system comprising an illumination source, an LSPR sensor comprising multiple reaction channels, an imaging sensor and a processor; (b) exposing the reaction channels to light from the illumination source; (c) capturing an image using the imaging sensor; and (d) using the processor: 1) finding a plurality of valid groupings of reaction channels, 2) determining total frame capture times for each valid grouping of channels, 3) determining a measure of exposure sub-optimality and estimating the expected error in peak wavelength for each valid grouping, 4) finding an optimal grouping by identifying the grouping with the lowest estimate of expected error in peak wavelength and 5) capturing a subsequent multi-channel image using the optimal grouping.

In one embodiment, the plurality of valid groupings of channels comprises 2 or more groupings of channels. In another embodiment, the plurality of valid groupings of channels comprises all possible valid groupings of channels.

In one embodiment, a valid grouping of channels comprises groupings wherein each group in the grouping only comprise contiguous channels. In another embodiment, the valid groupings are encoded using binary numbers.

In some embodiments, the error in peak wavelength for a grouping is estimated using interpolation of known peak wavelength errors at total frame capture times and exposure sub-optimalities close to those of the grouping. In other embodiments, the error in peak wavelength for a grouping is estimated using polynomial regression using pre-computed peak wavelength errors at predetermined total frame capture times and exposure sub-optimalities.

In some embodiments, the exposure sub-optimality for a group is equal to the lowest sub-optimality across all the channels in the grouping. In other embodiments, the exposure sub-optimality for a group is equal to the average sub-optimality over all the channels in the grouping. In still other embodiments, the exposure sub-optimality for a group is equal to the median sub-optimality across all the channels in the grouping.

1. DEFINITIONS

1.1. Acronyms

"LSPR" is the acronym for "Localized surface plasmon resonance."

1.2. Definitions

"Absorbance spectrum" is the spectrum of light absorbed by the LSPR gold nanoparticles, when a uniform input spectrum is incident on them.

"Channel image" is a 2D image formed on the imaging sensor of an LSPR spectrometer system by a specific ligand-analyte binding experiment.

"Contiguous channels" are defined as a set of channels whose channel images lie adjacent to each other in an image. No other channel image can lie between the channel images of contiguous channels.

"Localized surface plasmon resonance" means the collective oscillation of electrons at the interface of metallic structures.

"Nanoparticle" means a particle with one or more dimensions less than 100 nm.

"Reflectance spectrum" means the spectrum of light reflected from the LSPR gold nanoparticles, when a uniform input spectrum is incident on them.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Methods and systems for optimal capture of a multi-channel image in an LSPR spectrometer system are described herein. In one aspect, the method comprises: 1) finding a plurality of valid groupings of reaction channels, 2) determining total capture times for each grouping of channels, 3) determining a measure of exposure sub-optimality (or a measure of sub-optimal exposure or a degree of sub-optimal exposure), 4) estimating the expected error in peak wavelength for each valid grouping of channels, 5) finding an optimal grouping of channels by identifying the grouping with the lowest estimate of expected error in peak wavelength and 6) using the optimal grouping to capture a subsequent multi-channel image. In another aspect, the present invention describes a LSPR system and processor that can be used for carrying out a method for optimal capture of a multi-channel image.

As used herein, the reflectance spectrum is the spectrum of light reflected from the LSPR gold nanoparticles, when uniform input spectrum is incident on them. As used herein, the absorbance spectrum is the spectrum of light absorbed by the LSPR gold nanoparticles, when uniform input spectrum is incident on them.

As used herein, a channel image is a 2D image formed on the imaging sensor of an LSPR spectrometer system by a specific ligand-analyte binding experiment. Each of the multiple binding experiments being performed simultaneously in an LSPR spectrometer system produce a separate 2D image on the imaging sensor.

As used herein, contiguous channels are defined as a set of channels whose channel images lie adjacent to each other in an image. No other channel image can lie between the channel images of contiguous channels.

Figure 1:
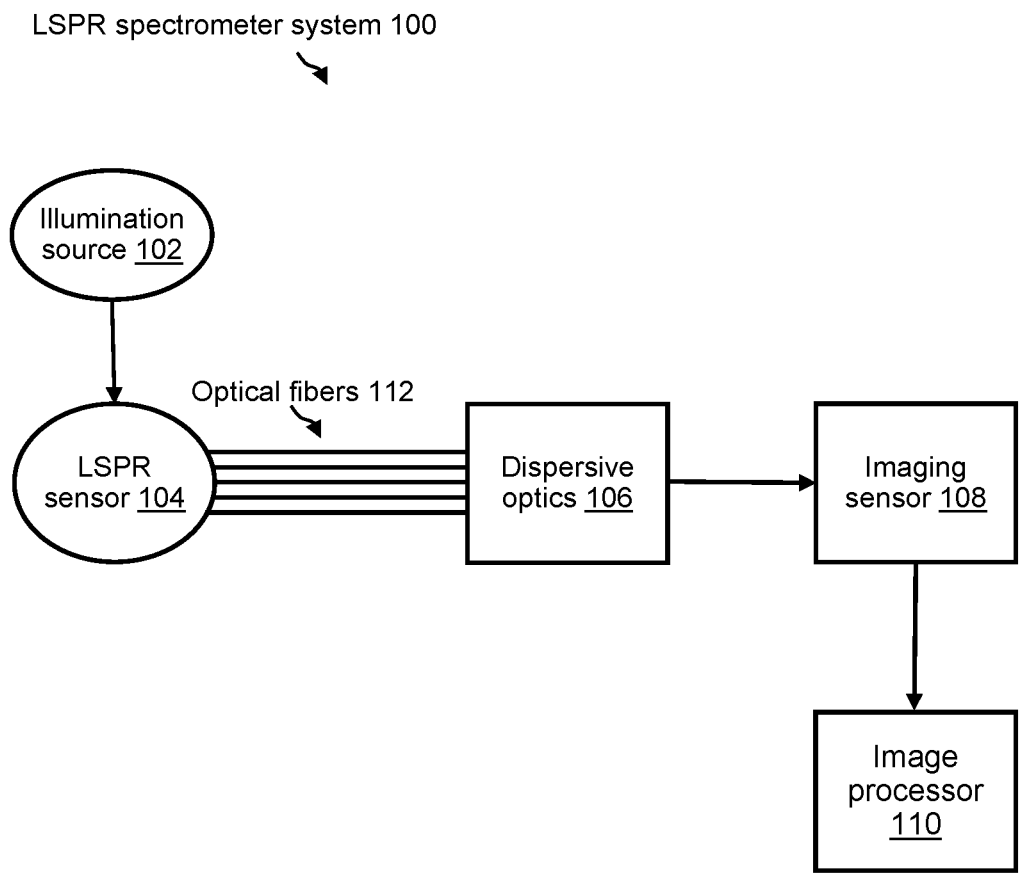
FIG. 1 illustrates an example LSPR spectrometer system according to principles described herein.

FIG. 1 is a schematic diagram of an example of an LSPR spectrometer system 100. The Local Surface Plasmon Resonance (LSPR) spectrometer is used in the art to determine the chemical affinity between a pair of molecules or bodies such as proteins, antigens, antibodies, drugs, etc. Each channel of an LSPR spectrometer system 100 comprises an LSPR sensor 104, having gold nanoparticles (AuNPs) deposited on its surface. In an embodiment, nanoparticles other than gold nanoparticles may be provided on the LSPR sensor 104. One of the bodies to be analyzed, the ligand, is immobilized on the AuNPs while the other body, the analyte, is introduced in the form of a fluid. The binding between the two bodies changes the optical properties of the AuNPs, causing a shift in the peak absorbance and reflectance spectra of the AuNPs. In an embodiment, an LSPR spectrometer system 100 comprises multiple LSPR sensors like LSPR sensor 104. An illumination source 102 may be used to shine light of a known spectrum onto the LSPR sensor 104. The reflected/transmitted light from the LSPR sensor 104 is coupled to optical fibers 112 and channeled to a dispersive optics 106. The dispersive optics 106 includes elements such as a diffraction grating which separates the light from the optical fibers 112 into its constituent wavelengths. This dispersed light then falls on an imaging sensor 108. In an embodiment, the imaging sensor 108 is a camera. The imaging sensor 108 maps the dispersed light into a 2D image which is analyzed by an image processor 110. The image processor 110 estimates the peak reflectance/absorbance wavelength of the AuNPs in the LSPR sensor 104. In an embodiment, image processor 110 may be dedicated hardware designed to perform the image processing task. In another embodiment, the image processor 110 may be a computer running a program which performs the computations for estimating the peak reflectance/absorbance wavelength of the LSPR sensor 104.

Figure 2:
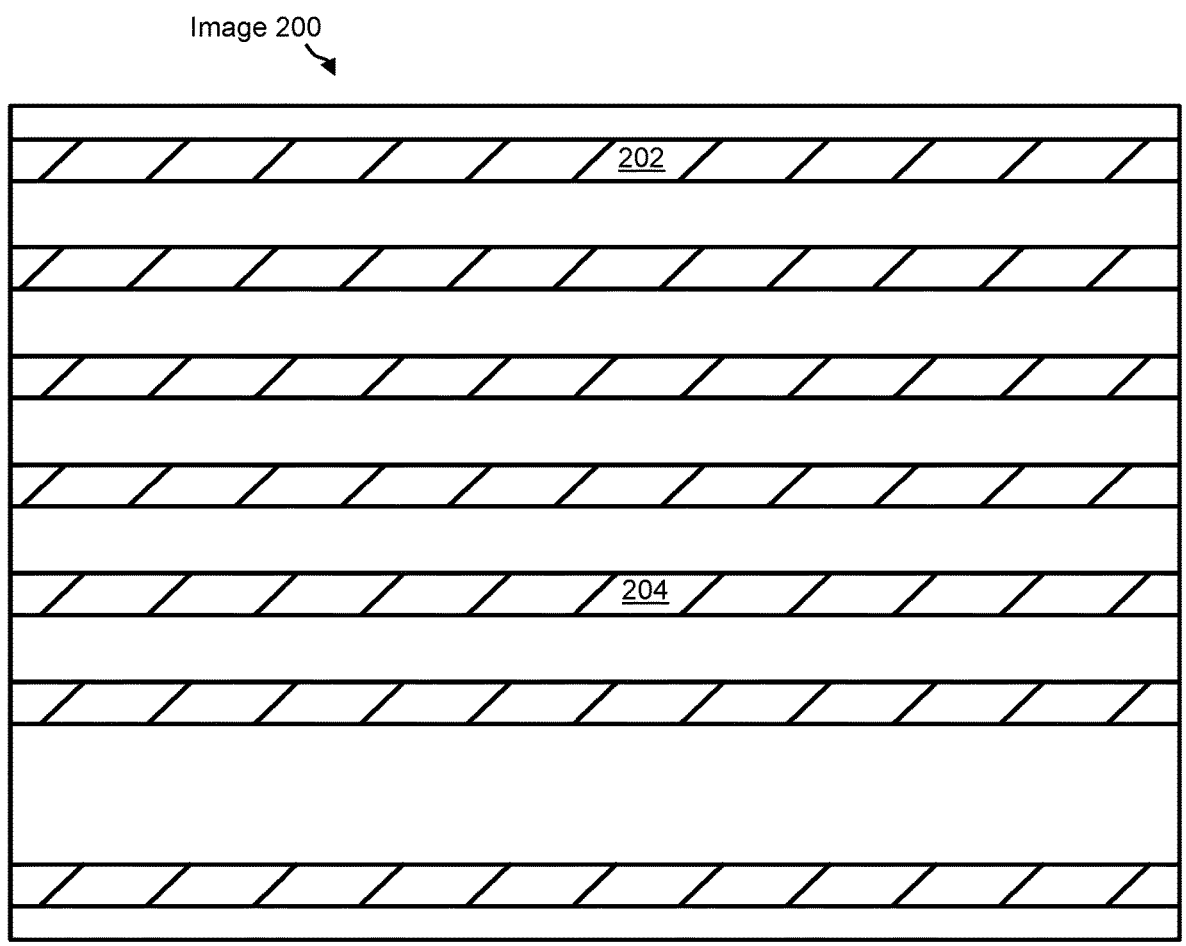
FIG. 2 illustrates an example of an image from the imaging sensor of an LSPR spectrometer system according to principles described herein.

FIG. 2 is a schematic diagram of an example image 200 from the imaging sensor of an LSPR spectrometer system. Image 200 contains multiple channel images, where each row is a channel image. Each channel image is recorded on separate pixels of image 200. Channel image 202 is the channel image for the first channel of the LSPR spectrometer. Channel image 204 is the channel image for the fifth channel of the LSPR spectrometer.

Figure 3:
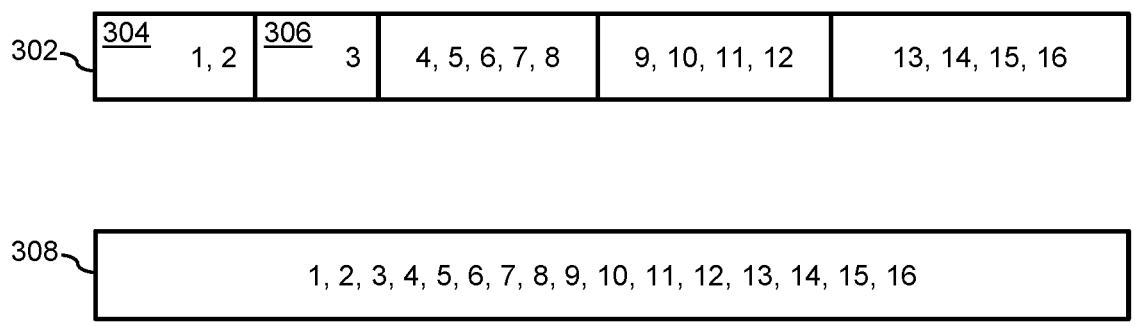
FIG. 3 illustrates example groupings of channels in an LSPR spectrometer system according to principles described herein.

FIG. 3 is a schematic diagram illustrating example groupings 300 of channels in an LSPR spectrometer system. For example, in one embodiment, an LSPR spectrometer system comprises 16 channels. As shown in FIG. 3, a grouping can comprise one or more groups of channels. For example, in one embodiment, grouping 302 comprises five groups of channels. Each group comprises a set of contiguous channels or a single channel. For example, as shown, group 304 of grouping 302 comprises channels 1 and 2 and group 306 comprises only channel 3. Furthermore, as shown in this example embodiment, grouping 302 further comprises a group comprising channels 4-8, a group comprising channels 9-12 and a group comprising channels 13-16, respectively. In another embodiment, a grouping can comprise a single group. For example, grouping 308 is an example grouping with a single group containing all channels (i.e., channels 1-16).

Figure 4:
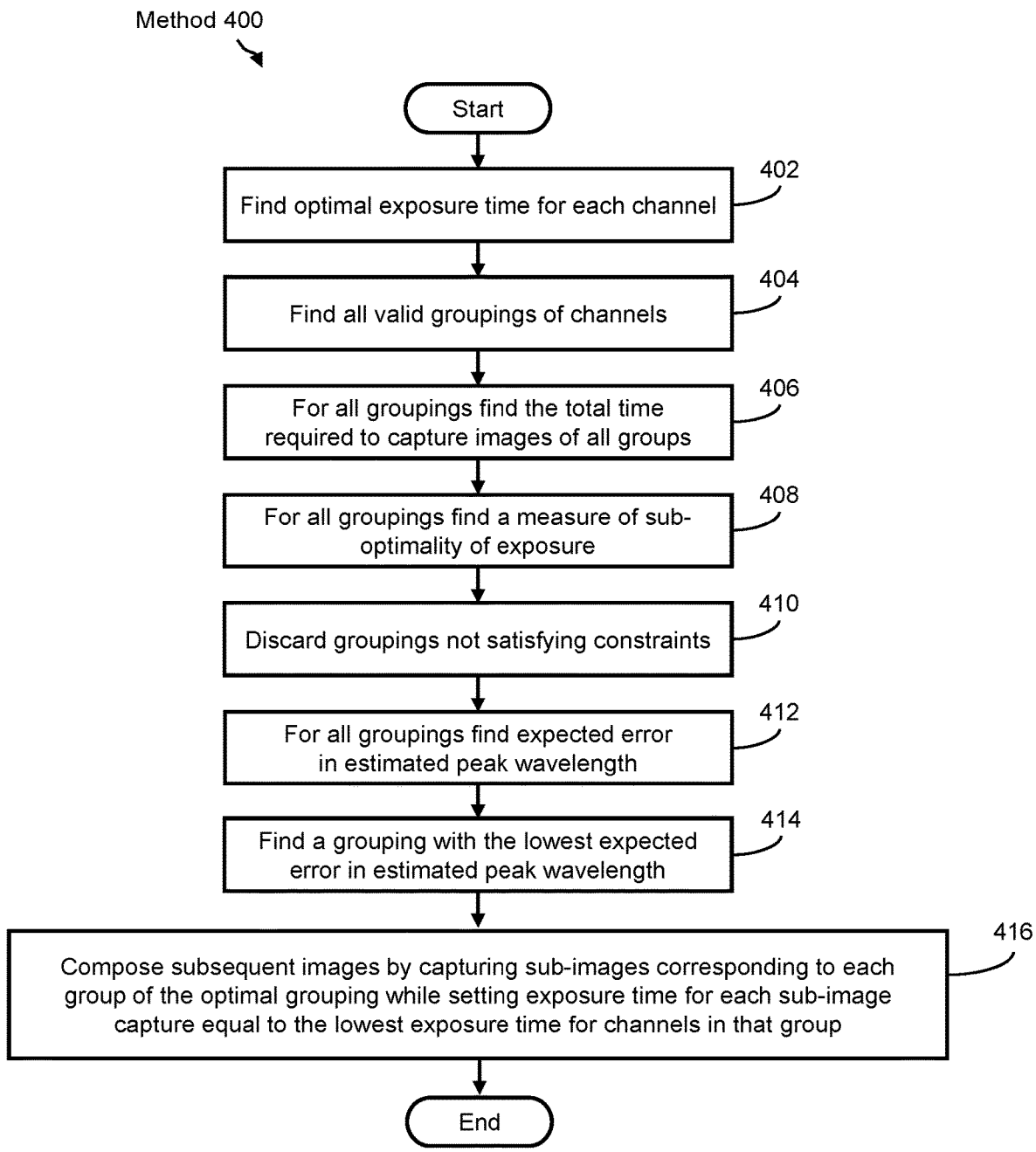
FIG. 4 illustrates an example method for optimal capture of a multi-channel image in an LSPR spectrometer system according to principles described herein.

FIG. 4 is a schematic diagram illustrating an example method 400 for optimal capture of a multi-channel image in an LSPR spectrometer system. It comprises a step 402 of finding optimal exposure time for each channel. In one embodiment, the optimal exposure time for a channel is the exposure time which causes the maximum pixel value in the channel image to be close to 85% of the saturation value of the imaging sensor. In another embodiment, the optimal exposure time for a channel is the exposure time which just saturates the channel image.

In a step 404, a plurality of possible valid groupings of channels are found, wherein each grouping of channels comprises a full collection of all LSPR reaction channels on a LSPR cartridge separated into one or more groups. As one of skill in the art would appreciate, there are a wide array of possible groupings of channels. For example, given a LSPR cartridge having 16 channels, one possible grouping of channels may comprise group A (channels 1 through 4), group B (channels 5 through 8), group C (channels 9 through 12) and group D (channels 13 through 16). In another example, given the same LSPR cartridge having 16 channels, another possible grouping of channels may comprise, group A (channels 1 through 2), group B (channels 3 through 6), group C (channels 7 through 8), group D (channels 9 through 10), group E (channels 12 through 14), and group F (channels 15 through 16). A valid grouping of channels is a collection in which each group in the grouping of channels comprises only contiguous channels. The plurality of valid groupings of channels can comprise 2, 3, 4, 5, 6, 7, 8, 9, 10, or more possible valid groupings of channels. In one embodiment, the step of finding valid groupings of channels comprises finding all possible groupings of channels and removing any groupings containing non-contiguous channels in a group.

In a step 406, the system (or processor) computes for each valid grouping of channels the total time required to capture images for all groups of channels in that grouping. In one embodiment, standard imaging sensor specifications are used to compute the times required to capture images for a group of channels.

In a step 408, the system (or processor) is used to compute a measure of sub-optimality of exposure for each group of channels. To avoid saturation of a channel image in a group of channels, the exposure time of each group of channels is set to the minimum exposure time for the channels in that group. As a result, some of the remaining channels in the group of channels could be exposed for a lower amount of time than the optimal time for that group of channels, causing sub-optimal exposure or a degree of sub-optimal exposure (also referred to herein as exposure sub-optimality) of one or more channels in the group. In one embodiment, exposure sub-optimality of a channel in a group of channels is defined as the ratio of the lowest optimal exposure time for the channels in the group to the optimal exposure time for that channel. In another embodiment, the exposure sub-optimality of a grouping of channels is defined as the lowest exposure sub-optimality across all channels in the grouping.

In still another embodiment, the exposure sub-optimality of a grouping is defined as the mean exposure sub-optimality over all channels in the grouping.

In yet another embodiment, the exposure sub-optimality of a grouping is defined as the median exposure sub-optimality across all channels in the grouping.

In a step 410, any grouping of channels that do not satisfy predefined constraints are discarded. In one embodiment, the total time required to capture all groups in a grouping of channels has a lower bound constraint due to firmware data processing limitations (e.g., the rate at which the firmware can process a 2D image created by the imaging sensor). In this embodiment all groupings having a total capture time lower than the lower bound are discarded.

In a step 412, the expected error in peak wavelength for each grouping of channels is estimated. In one embodiment the expected error in estimated peak wavelength is determined for a number of different frame rate and exposure sub-optimality combinations. This is done by analyzing the 2D image sequence from the LSPR spectrometer system for each of a plurality of different frame rates and exposure sub-optimality combinations and computing the error in estimated peak wavelength for these combinations.

In one embodiment, the expected error in estimated peak wavelength for a grouping of channels can then be computed by interpolating the expected error in estimated peak wavelength at the plurality of frame rates and exposure sub-optimality combinations for that grouping.

In another embodiment, polynomial regression is used to estimate the expected error in peak wavelength for each grouping of channels, using pre-computed errors in peak wavelengths at predetermined frame rate and exposure sub-optimality combinations. For example, in one embodiment, let $E_{ij}$ represent the computed error in estimated peak wavelength for frame rate $F_i$ and exposure sub-optimality $S_j$. A function $\hat{E}$, which is a polynomial function in frame rate F and exposure sub-optimality S, is computed such that it best represents values $E_{ij}$ in the least squares sense.

For example, if $\hat{E}$ is chosen as $\hat{E}=a+bF+cS+dF^2+eSF+fS^2$. Using definition of $E_{ij}$ above, we can write $E_{ij}=a+bF_i+cS_j+dF_i^2+eS_jF_i+fS_j^2$. Using plurality of computed $E_{ij}$, $F_i$ and $S_j$ the best-fit coefficients [a, b, c, d, e, f] above can be computed in the least square sense using techniques well known in art.

After computing the expected error in estimated peak wavelength for all possible groupings of channels in step 412, a step 414 determines the optimal grouping by finding the grouping of channels with the lowest error in estimated peak wavelength.

The optimal grouping is subsequently used to derive 2D images comprising multi-channel image captures. This 2D image capture sequence can then be repeated for all subsequent 2D images captured by the imaging processor. Finally, at a step 416 sub-images corresponding to each group of the optimal grouping of channels are captured. In one embodiment, step 416 is repeated at every frame time interval. In another embodiment, the exposure time for capturing each group sub-image of step 416 is equal to the lowest exposure time for channels in that group.

Figure 5:
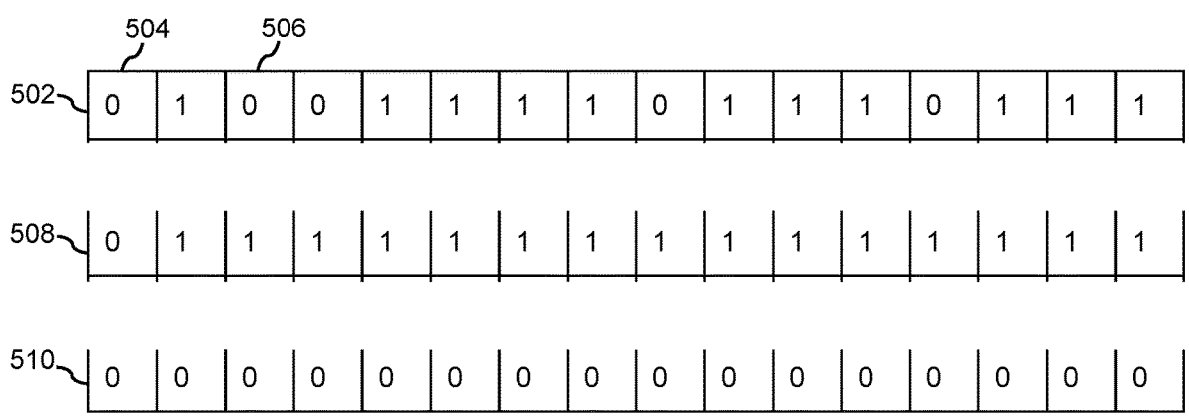
FIG. 5 illustrates an exemplary method to find all valid groupings of channels in an LSPR spectrometer system according to principles described herein.

FIG. 5 is a schematic diagram illustrating an example method 500 to find all valid groupings of channels in an LSPR spectrometer system. A valid grouping is a grouping in which each group comprises only contiguous channels. The method 500 comprises using a coding scheme to encode possible groupings of channels, such that the resulting groupings are all valid. Coding 502 represents an example coding scheme for encoding one of the valid groupings. A '0' at a particular position represents that a group in the grouping begins with the corresponding channel. For example, '0' at the first position 504 means that the first group of the grouping encoded by coding 502 begins at channel 1. All channels corresponding to the contiguous train of '1' following a '0' belong to the same group. Thus, the first group of grouping encoded by coding 502 comprises channels 1 and 2. A '0' at third position 506 is not followed immediately by '1'. So, the second group of grouping encoded by coding 502 comprises the single channel number 3.

Coding 508 has '0' at the first position followed by '1' at 15 positions. Thus, it represents a grouping having a single group containing all channels in the same group. This can be represented by channel grouping 308 discussed previously where grouping 308 is an example grouping with a single group containing all channels. Coding 510 has '0' at all positions. Thus, it represents a grouping having 16 groups each comprising a single channel.

Method 500 produces only valid groupings since only contiguous channels can be a part of the group. Groupings encoded by method 500 will have '0' at the first position since the first group of any coding begins with the first channel. Other positions could contain either '0' or '1'.

Thus, a grouping could be encoded as an n-1 bit binary number, where n is the total number of channels in an LSPR spectrometer system. As there are $2^{n-1}$ numbers that can be encoded in n-1 bits, there are $2^{n-1}$ valid groupings for an LSPR spectrometer system with n channels.

I claim:

1. A method for optimal capture of a multi-channel image in a Localized Surface Plasmon Resonance (LSPR) spectrometer system, the method comprising:
   (a) finding one or more groupings of channels using a first image;
   (b) determining a total capture time for each of the one or more groupings of channels;
   (c) determining a exposure sub-optimality for each channel of the one or more groupings of channels;
   (d) estimating an expected error in peak wavelength for each channel of the one or more groupings of channels using the total capture time and the exposure sub-optimality;
   (e) finding an optimal grouping of the one or more groupings of channels by identifying a grouping with the lowest estimate of expected error in peak wavelength; and
   (f) capturing a subsequent image using the optimal grouping.

2. The method of claim 1, wherein the grouping of one or more groupings of channels comprises at least 2 channels.

3. The method of claim 1, wherein the one or more groupings of channels comprises all possible groupings of channels.

4. The method of claim 1, wherein each of the one or more groupings of channels only comprises contiguous channels.

5. The method of claim 1, wherein the one or more groupings of channels is encoded using binary numbers.

6. The method of claim 1, wherein the exposure sub-optimally for a each of the one or more groupings of channels is equal to the lowest exposure sub-optimally across all channels in the grouping.

7. The method of claim 1, wherein the error in peak wavelength for a is estimated using interpolation of known peak wavelength errors at total frame capture times and exposure sub-optimalities.

8. The method of claim 1, wherein the error in peak wavelength is estimated using polynomial regression using pre-computed peak wavelength errors at predetermined total frame capture times and exposure sub-optimalities.

9. The method of claim 1, wherein the exposure sub-optimality for a a grouping of the one or more groupings of channels is equal to the average exposure sub-optimality over all channels in the grouping.

10. The method of claim 1, wherein the exposure sub-optimality for a a grouping of the one or more groupings of channels is equal to the median exposure sub-optimality across all channels in the grouping.

* * * * *